Dec. 16, 1952 L. L. KOROS 2,622,149

EQUALIZER SYSTEM

Filed Dec. 28, 1948 2 SHEETS—SHEET 1

INVENTOR
Leslie L. Koros
BY Harry Tunick
ATTORNEY

CURVE A: FREQUENCY RESPONSE OF ONE CHANNEL WITHOUT EQUALIZER
CURVE B: FREQUENCY RESPONSE OF THE EQUALIZER
CURVE C: FREQUENCY RESPONSE OF ONE EQUALIZED CHANNEL

CURVE D: FREQUENCY RESPONSE, INVERSION AND REINVERSION, WITHOUT EQUALIZER
CURVE E: THE SAME WITH EQUALIZER

INVENTOR
Leslie L. Koros
BY
Harry Tunick
ATTORNEY

Patented Dec. 16, 1952

2,622,149

UNITED STATES PATENT OFFICE 2,622,149

EQUALIZER SYSTEM

Leslie L. Koros, Camden, N. J., assignor to Radio Corporation of America, a corporation of Delaware Application December 28, 1948, Serial No. 67,731

1 Claim. (Cl. 178—44)

Figure 1:
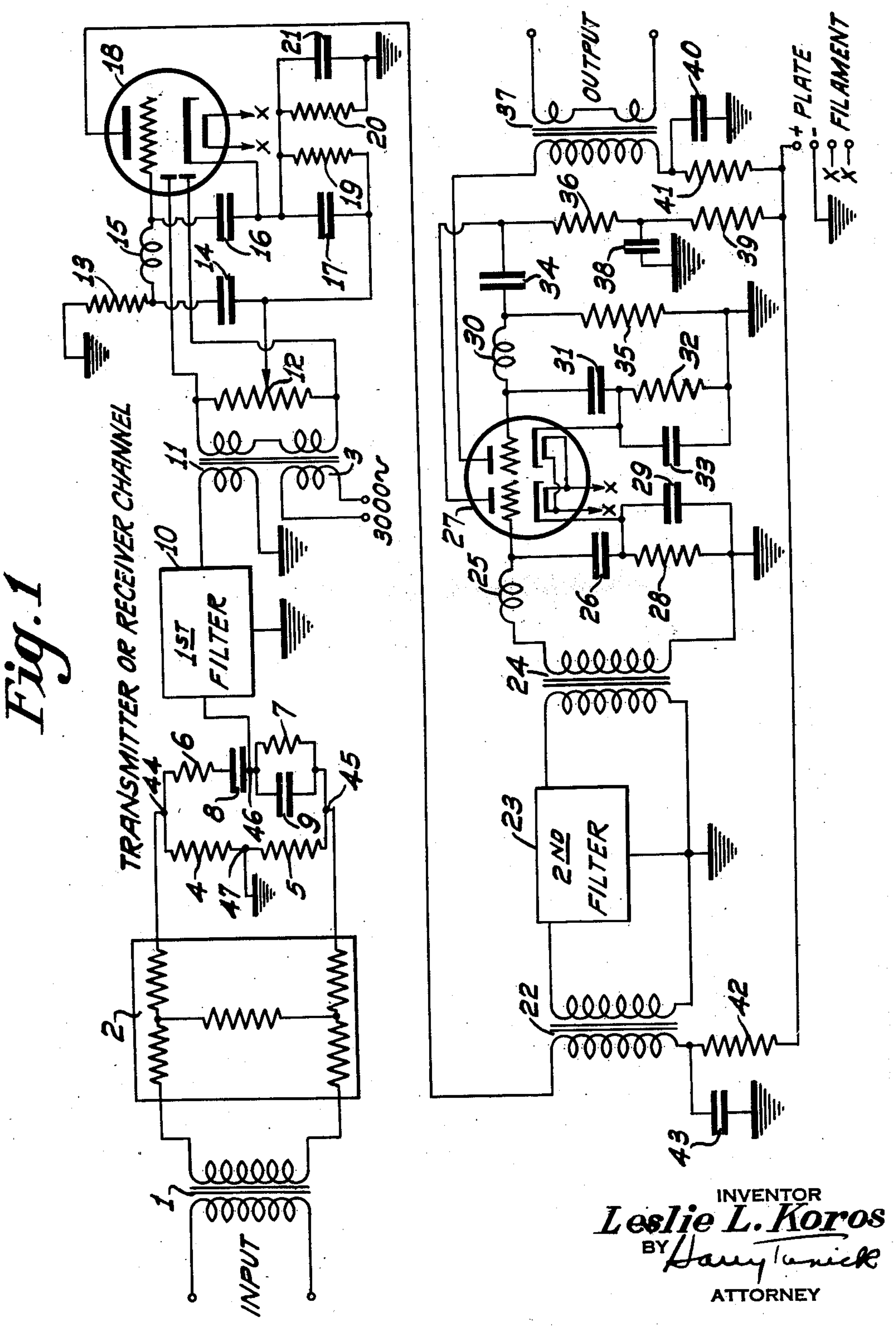

This invention relates to an equalizer system which is especially useful for amplifiers with bandpass filters.

A bandpass filter such as used in communication and broadcast equipment, due to the losses of its elements, has not the sharp cut-off characteristic which can be calculated according to the theory of ideal or lossless filters. Filters built with condensers and inductances are especially critical, in the selection of the core material and size of the inductances. The losses of the condenser have generally less influence, if the condensers are of a good average quality. Filters with a sharp cut-off characteristic can be built only if the Q, i. e., the ratio of the reactance to effective resistance of the filter coil, is higher than 200. It is difficult to build coils with this high Q value, a Q of 100 being accepted as good value for inductances, built with expensive core material, for communication equipment of highest quality. However, filter inductances with Q=100 produce pronounced losses in the two ends of the passband.

This problem is important for any amplifier with filter, but is of special importance in speech inverter equipment. In the ordinary speech inverter, the passband is limited to 300 to 2700 C. P. S. The common practice is to let the intelligence flow through two low-pass filters. The cutoff frequency of the first low-pass filter is generally chosen about 2800 C. P. S. The maximum attenuation point of the first filter is 3000 C. P. S. If the filtered frequency spectrum is modulated on a carrier frequency of 3000 C. P. S. The modulator is generally a balanced one and produces mainly the frequency groups of "3000 C. P. S.+intelligence" and "3000 C. P. S.—intelligence," or the upper and lower sidebands, respectively.

The output of the modulator flows through a second low-pass filter of similar characteristics to the first low-pass filter. The second low-pass filter passes the lower sideband or frequency spectrum, which is the inverted intelligence. The two low-pass filters, the first applied before the modulation process and the second applied after the modulation process, have together the same effect for the passband as a bandpass filter has in a common amplifier, i. e. the inverted intelligence band is limited to the frequencies between 300 and 2700 C. P. S. Consequently, all the considerations discussed above are valid also in the case of the speech inverter, provided that the Q of the filter coils is not exceptionally high. In the case of the speech inverter, the situation is worse than in the case of a common amplifier with bandpass filter, because the filtering process is applied twice.

The inverted intelligence is transmitted by radio waves or by wire connections to a receiver station. In the receiving end, the inverted intelligence, which cannot be understood, will flow again through a second speech inverter channel similar to that in the transmitter channel. After passing the first filter, modulator or second filter of the receiver channel speech inverter, the inverted intelligence is reinverted, i. e. is reconverted to its original intelligibility. A practical example follows: input frequency=800 C P. S.; inverted frequency=3000—800=2200 C. P. S.; reinverted frequency=3000—2200=800 C. P. S., the original input frequency.

The speech inverter introduces, according to its filter losses, an approximate 2 to 3 db loss at the two ends of the passband. The two losses, i. e. of the sending end and receiving end, produce together a loss of approximately 4 to 6 db which reduces the intelligibility of the communication, which is already limited in its frequency spectrum.

The losses at the two ends of the passband become much higher if the filter coil core is not made of a special low-loss material. The common practice is to use, as filter coil core, a laminated silicon iron of about 1.5 watts loss per kilogram, at 10 kilogausses and 60 C. P. S. With this kind of core material, in the usual sizes the best Q value is about 20 to 30; therefore, the frequency response becomes more imperfect.

The present invention provides a simple method of correcting the losses of the frequency response, at the two ends of the passband, of the amplifier with bandpass filter or of the speech inverter or similar equipment.

Figure 2:
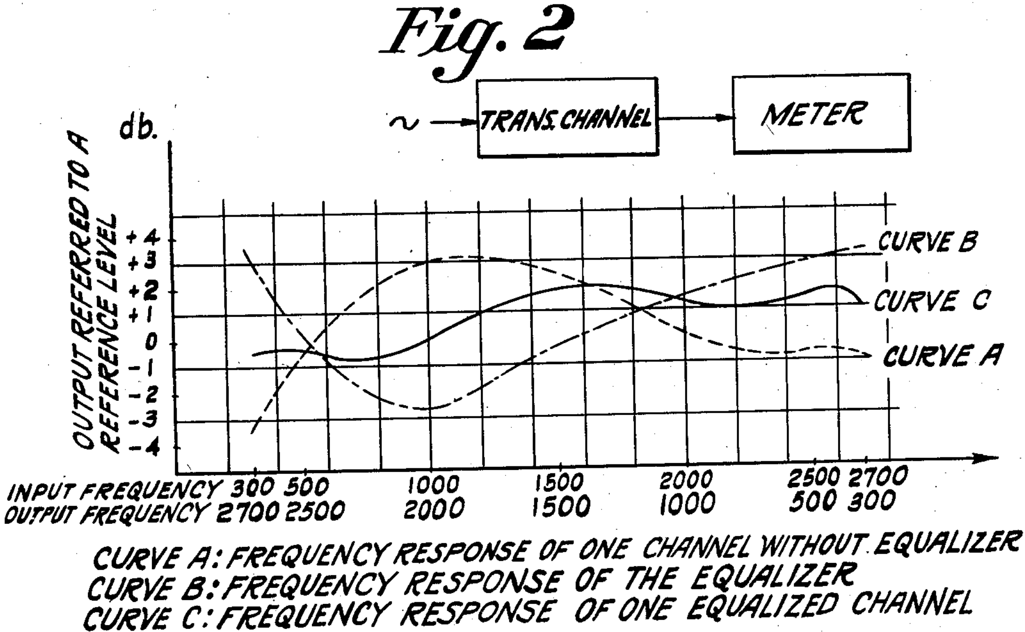
Figure 3:
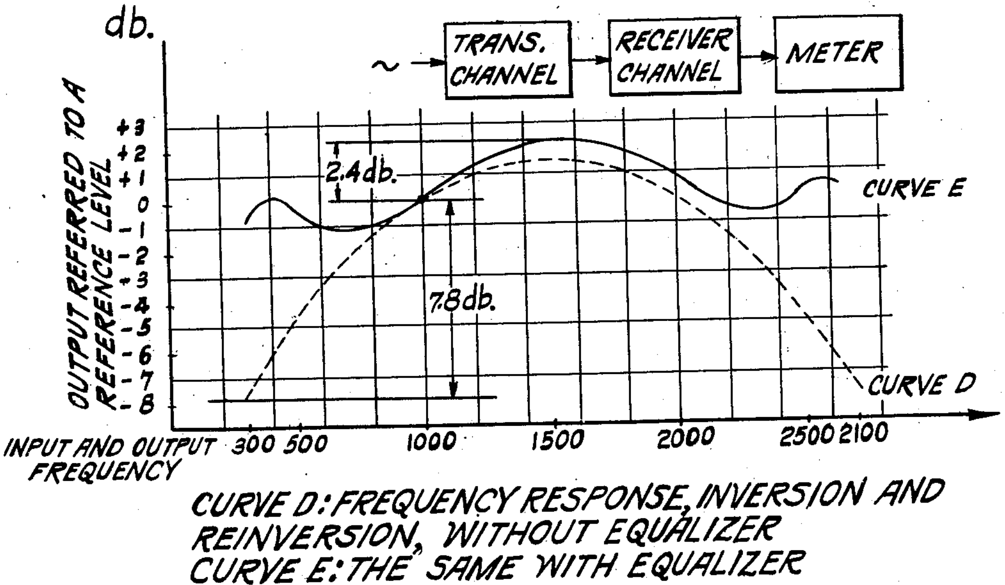

In the drawings, Fig. 1 represents diagrammatically an embodiment of this invention, while Figs. 2 and 3 are sets of curves representing the results obtainable with the invention.

In Fig. 2, curve A represents the frequency response of a speech inverter channel. The first filter of the channel is built of two "pi" sections and the second filter of ½+2+½ "pi" sections. The filter inductances have a Q of 25 at the corresponding maximum attenuation frequencies. As curve A of Fig. 2 shows, the frequency response losses at the lower and upper ends of the passband (300 and 2700 cycles) are 6.6 db and 4 db, respectively, with respect to the value at the highest point of the curve (at about 1150 C. P. S.), and 6.4 db and 3.8 db with respect to the value at the reference frequency of 1000 C P. S.

Curve D in Fig. 3 shows the frequency response of two speech inverter channels of a complete communications system, with inversion and reinversion of the voice. 9.2 db is the maximum difference between the two ends of the passband and the band's center frequency. In other words, −7.8+1.4 db is the maximum difference throughout the passband with respect to zero db at the reference frequency of 1000 C. P. S. These values described with reference to curves A and D were observed in equipment without equalizers.

In some practical and prior speech inverters, it was attempted to correct the frequency response in the following way: a pre-emphasis was applied, in the transmitter channel, at one end of the passband. The pre-emphasis gain had the sum value of the losses at both ends of the passband. In the case of curve A of Fig. 2, the pre-emphasis would be 6.6+4=10.4 db. With such pre-emphasis, the losses of the transmitter and the receiver channel, at one end of the passband, would be corrected in the transmitter channel. The receiver channel had, at the other passband end, a similar pre-emphasis. This method produces an improved over-all frequency response, but reduces heavily the output, if the inverted message is transmitted by a wireless transmitter. The pre-emphasis of about 6 db above the center frequency in one end of the narrow band of 300 to 2700 C. P. S. impedes the utilization of the whole modulation capacity of the wireless transmitter, 100% modulation being reserved for the peaked passband end only. This introduces an average audio power loss of about 75%. A transmitter of 1 kw. produces, in this way, sidebands of the same level as a 250 w. transmitter with 100% modulation. The noise level, of course, is of the amplitude corresponding to a transmitter with a 1 kw. carrier output level. The peaking of one passband end in each channel is not the correct solution to the problem.

The circuit according to this invention permits the use of a cheap and mechanically strong filter coil design of common iron, and therefore reduces considerably the price of the communications equipment and permits utilization of the whole power capacity of the transmitter. Practical designs according to this invention, with filter coils of $Q$=20 to 30, can have better performance than designs with expensive filter coils of $Q$=100 or even higher, up to 200 for example.

The basic idea of the invention is to use an equalizer network in an amplifier or in each speech inverter channel, said network being composed of resistors and condensers connected in the manner hereinafter described. One advanced form of the invention is to apply filter chokes with condensers, or filter resistors with condensers, in the grids of the amplifier stages, in addition to the main equalizer network.

A practical circuit of the invention is shown in Fig. 1. Fig. 1 represents the transmitter or receiver channel of a speech inverter circuit. Fig. 1 represents also an example of similar considerations which could be applied to other types of equipment with bandpass filters. 1 is the input transformer in one channel. 2 is an attenuator. The special function of this attenuator, according to this invention, is to produce a mainly ohmic reflected resistance at the input terminals. The attentuation value of this attenuator should be about 8 db, if a ratio $R/R-jZ$ equal to or greater than 0.9 is wanted, where R is the reflected input resistance and Z is the capacitive component of the equalizer system 4, 5, 6, 7, 8 and 9.

The four resistors 4, 5, 6 and 7 and two condensers 8 and 9 form a bridge circuit which is similar in its form to the Wien bridge, this bridge circuit having its input terminals 44 and 45 connected to the output of attenuator 2. In this invention, however, the conventional balanced condition of the Wien bridge, for one audio frequency, is not fulfilled. By the elements 4, 5, 6, 7, 8 and 9 no frequency will be totally eliminated. The parallel-series circuit of the condenser-resistor combination 4—9 produces attenuation of predetermined frequencies. Near to the frequency, which is transmitted by the filter at the highest level, should be the frequency most attenuated by the equalizer circuit.

Curve B in Fig. 2 represents the frequency response of a practical equalizer. Table 1 following gives the values of the elements of the equalizer having the frequency response as shown in Fig. 2, curve B. The values given in Table 1 represent only one example; the values of the equalizer circuit components, according to this invention, are to be individually determined in each case. The equalizer frequency characteristic should follow as closely as possible the filter frequency characteristic but in the opposite sense; it should peak the attenuated frequencies and attenuate the peaked frequencies. In practical cases, however, for a special kind of filter system the capacitance and resistance values of the equalizer can be predetermined.

The resistors 4, 5, 6 and 7 in Fig. 1 can be a single wire-wound resistor with taps. By adjusting the taps in the final testing process, it is possible to assure a very uniform electrical performance of communication equipments produced in large quantities.

*Table*

| Resistor | Ohms | Condenser | Mfd. |
|---|---|---|---|
| 4 | 900 | 8 | .25 |
| 5 | 635 | 9 | .25 |
| 6 | 835 | -------- | ---- |
| 7 | 470 | -------- | ---- |

The frequency response of the channel without equalizer follows curve A in Fig. 2. The frequency response of the equalizer circuit is represented by curve B and the frequency response of the equalized channel by curve C.

Curve C, the frequency response of the equalized channel, is the summation of curves A and B, since the equalizer circuit 4—9 is effectively connected in series in the communication (transmitter or receiver) or speech inverter channel. From an examination of curve C, it may be seen that the frequency response loss at the lower end of the passband has been reduced, by means of the equalizer circuit, to approximately 2.4 db, with respect to the db value at the highest point of the curve (about 1650 C. P. S.), while the frequency response loss at the upper end of the passband has now been reduced to approximately 0.8 db with respect to the same reference db value. With respect to the db value at the reference frequency of 1000 C. P. S., the frequency response losses at the lower and upper ends of the passband have now been reduced, by means of the equalizer circuit, to 0.5 and 1.1, respectively. Thus, a very great improvement in the frequency response has been accomplished, the nonuniform frequency-transmission characteristic being rendered more nearly uniform, to a substantial degree.

In Fig. 3, curve D represents the frequency response of a channel for inverted and reinverted intelligence without equalization, and curve E represents the same, with the equalizer circuit according to this invention. The frequency deviation of −7.8+1.4 db. of the unequalized speech inverter channel is reduced to −1.1+2.4 db by the equalizer circuit. These values are taken from a typical speech inverter, adjusted by a worker without special technical knowledge. By systematic adjustment work, about ±1 db deviation in the channel frequency response, throughout the passband, can be assured, with Q values as low as 20 to 30 in the filter coil.

The equalizer elements 4, 5, 6, 7, 8 and 9 form a symmetrical circuit. The input terminals 44 and 45, located between the elements 4, 6 and 5, 7, respectively, could be inverted with the output terminals 46 and 47, which are between 8, 9 and 4, 5, respectively. The values of the elements, however, are determined slightly differently in the two different connection forms just described.

The equalizer circuit of this invention is a very efficient one. It is very useful for compensating for nonuniform frequency responses of filters, and represents a very simple and cheap design.

Referring again to Fig. 1, the equalizer circuit is coupled to the first filter 10 by means of output terminals 46 and 47, and the first filter is coupled to the transformer 11. In this transformer are combined the intelligence and the 3000 C. P. S. carrier, supplied from a suitable source (not shown). The 3000 C. P. S. carrier is coupled to coil 3 of transformer 11. The diode plates of the tube 18, which is in this case a 6SR7 type, are connected in a balanced converter circuit with the load resistor 19 and condenser 17 to form a balanced modulator. 12 is a potentiometer to assure symmetry in the modulator. 15 is an additional filter coil and 16 is a filter condenser. These two elements and circuit components 25, 26, 30 and 31 have important functions in the equalizer system.

The equalizer circuit formed by the elements 4, 5, 6, 7, 8 and 9 tends to peak the low and high frequencies. The chokes 15, 25 and 30 and condensers 16, 26 and 31 in the grid circuits of the following amplifier stages limit the high-frequency peaking effect of the equalizer. The low-frequency peaking effect will be generally compensated by the magnetizing inductances of the audio transformers.

The chokes and condensers in the grid circuits accomplish a further advantageous result. They permit the location of the speech inverter and amplifier near to a transmitter, the transmitted intelligence practically not being detected by the amplifier tubes. The detector effect introduces feedback in common circuits between the line or microphone amplifier or speech inverter and the transmitter. With the coil-condenser circuits, the feedback will be eliminated, or at least reduced, and therefore one source of the distortion of the communication equipment is substantially eliminated. Speech inverter circuits are inherently critical for the detection of dispersed R.-F. fields, because of the rectifier effect of the modulator. The filter chokes 15, 25 and 30 can be replaced by ohmic resistors if desired. The value of the choke inductances can be chosen between .5 and 2 millihenries. The shunt condensers could be between 100 and 3000 mmf. Resistors of 1000 to 20000 ohms value, and of small size (1/4 to 1/10 watt dissipation) could be used instead of the chokes, in many cases.

The other elements of Fig. 1 have conventional functions. 13 is the grid resistor of tube 18, while 14 is the coupling condenser for the same grid. 20 is a bias resistor, 21 its bypass condenser, while 22 is an interstage transformer. 23 is the second filter and 24 the input transformer of the audio amplifier, formed in this special case by the 6SN7 double triode 27. The transformer 24 compensates for the voltage losses produced in the equalizer. 28 and 32 are the bias resistors of the triodes, while 29 and 33 are the bypass condensers. 34 is a coupling condenser between the two triodes, and 35 a grid resistor for the second triode. 36 is the plate resistor of the first triode. 37 is the output transformer of the speech inverter channel. 39, 41 and 42 are decoupling and filter resistors, while 38, 40 and 43 are decoupling and filter condensers, for the plate current supply source.

In this example, the audio amplifier part is placed after the equalizer in the circuit, and the first filter is connected between them. It makes no difference, for the invention, to connect the elements in other ways, e. g., the equalizer could be coupled to the plate circuit of the amplifier tube 18.

It is desired to be pointed out that, according to this invention, the transmitter and receiver channels are equalized individually. According to the prior art, it has been attempted to compensate for, in the transmitter channel of speech inverters, the poor frequency response of both the transmitter and receiver channels. This prior method of compensation does not permit the utilization of the whole modulation capacity of the wireless transmitter, 100% modulation being reserved for the peaked frequencies only. This reduces heavily the average output level of the radiated side bands.

With the system of this invention, the transmitter can be modulated nearly 100% throughout the entire frequency band, thus making better use of the available R.-F. bandwidth.

What I claim as my invention is:

In a communication channel: a bandpass filter having a non-uniform frequency-transmission characteristic over its passband; a bridge circuit having four arms, the first and second arms each comprising a resistor, the third arm comprising a resistor and a capacitor in series, and the fourth arm comprising a resistor and a capacitor in parallel, said bridge having a non-uniform frequency-transmission characteristic such as to compensate for the nonuniformity of the filter bandpass characteristic; two input terminals at oppositely-located corners of said bridge; two output terminals at the other two oppositely-located corners of said bridge; means coupling said input terminals to a source of signals in said channel; means coupling said output terminals to the input of said filter; an electronic amplifier having a pair of input electrodes; a coupling between the output of said filter and said input electrodes; an inductance in said last-named coupling connected in series in the signal path to one of said electrodes; and a capacitance in said last-named coupling connected between said pair of electrodes, said inductance and said capacitance together operating to limit the peaking effect at high frequencies of said bridge circuit.

LESLIE L. KOROS.

REFERENCES CITED

The following references are of record in the file of this patent:

UNITED STATES PATENTS

| Number | Name | Date |
|---|---|---|
| 1,836,809 | Mason | Dec. 15, 1931 |
| 2,037,285 | Tasker | Apr. 14, 1936 |
| 2,122,191 | Ballantine | June 28, 1938 |
| 2,207,796 | Grundmann | July 16, 1940 |
| 2,263,519 | Ritzmann | Nov. 18, 1941 |
| 2,484,052 | Rose | Oct. 11, 1949 |